March 12, 1963 HANS-JOACHIM M. FÖRSTER 3,080,772
SPEED-CHANGE TRANSMISSION, PARTICULARLY
FOR MOTOR VEHICLES
Original Filed Dec. 8, 1951 2 Sheets-Sheet 1

Inventor
Hans-Joachim M. Förster
By Dicke and Craig
Attorneys

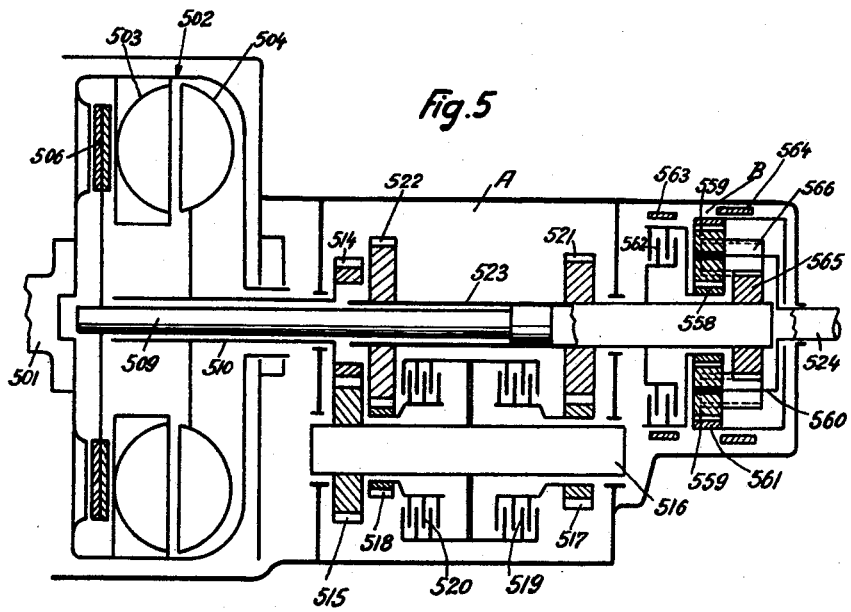

United States Patent Office 3,080,772
Patented Mar. 12, 1963

3,080,772
SPEED-CHANGE TRANSMISSION, PARTICULARLY FOR MOTOR VEHICLES

Hans-Joachim M. Föerster, Stuttgart-Bad Cannstatt, Germany, assignor to Daimler-Benz Aktiengesellschaft, Stuttgart-Unterturkheim, Germany
Original application Dec. 8, 1951, Ser. No. 260,668, now Patent No. 2,892,355, dated June 30, 1959. Divided and this application Nov. 10, 1958, Ser. No. 773,806
31 Claims. (Cl. 74—688)

The present application is a divisional application of the copending application Serial No. 260,668 filed on December 8, 1951, entitled "Speed-Change Transmission, Particularly for Motor Vehicles," now Patent No. 2,892,-355.

The invention relates to a speed change transmission, particularly for motor vehicles, and more especially to a transmission of the type including a hydrodynamic clutch incapable at very low speeds of transferring any appreciable driving torque and, therefore, of stalling the engine when the driven shaft is arrested, such as by stopping the vehicle.

It is the object of the present invention to provide a transmission of that type which excels by its simplicity and ruggedness and thus lends itself to manufacture at a low cost and yet is reliable in operation.

Further objects of the invention will appear from a detailed description of a number of embodiments shown in the accompanying drawings and the features of novelty will be pointed out in the claims.

In the drawings, which illustrate more or less diagrammatically a number of embodiments of the invention without, however, restricting the invention thereto, FIGURE 1 is a transmission including a hydrodynamic clutch and a secondary transmission shaft, said transmission having four forward speeds;

FIGURE 5 illustrates another transmission for six speeds including a secondary transmission shaft and an epicyclic gearing;

FIGURE 6 is a diagrammatic cross section through the epicyclic gearing shown in FIGURE 5; and FIGURE 7 is a partial axial section through a five-speed transmission including two epicyclic gearings arranged in tandem.

Figure 1:
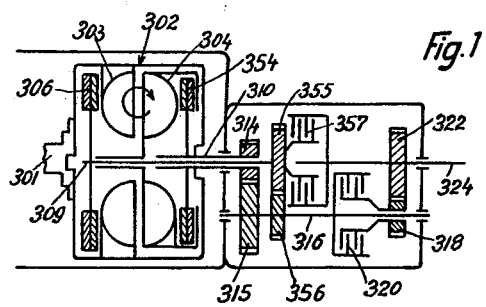

The transmission shown in FIGURE 1 comprises a driving shaft 301 that may be the crankshaft of an automobile engine, a driven shaft 324 which may be the shaft driving the rear axle transmission of the motor vehicle, and two motion-transmitting trains of elements, each of which connects the driving shaft 301 with the driven shaft 324 and which will be described hereinafter. The first motion-transmitting train of elements includes a hydrodynamic clutch designated as a whole by 302 and composed of the driving section 303 rigidly connected with shaft 301 and the driven section 304. The driving section 303 is connected by a disengageable friction clutch 306 with the inner shaft 309 of a pair of shafts 309 and 310 mounted in nested relationship. The driven section 304 of the hydrodynamic clutch is connected by a friction clutch 354 with the other shaft 310 of the pair of nested shafts. There is a secondary transmission shaft 316 spaced from the pair of shafts 309, 310 and extending parallel thereto and suitably journalled in transverse walls of the transmission casing. The shaft 316 is permanently geared to the hollow shaft 310 by a pair of meshing gears 314, 315. Moreover, shaft 316 is permanently geared to the inner shaft 309 by a pair of meshing gears 355, 356. Also, the secondary transmission shaft 316 carries a freely rotatable gear 318 engaging a gear 322 fixed to the driven shaft 324 and is adapted by a multi-disk friction clutch 320 to be clutched to gear 318. Another multi-disk friction clutch 357 is adapted to rigidly connect the two shafts 309 and 324 which are mounted in aligned relationship. If desired, gear 318 may be fixed to shaft 316 and gear 322 may be freely rotatable on but adapted by a friction clutch to be clutched to shaft 324.

For setting the transmission to first gear the clutches 320 and 354 are engaged, whereas the clutches 306 and 357 are disengaged. Power is transmitted from the driving shaft 301 to the driven shaft 324 through the elements 303, 304, 354, 310, 314, 315, 316, 320, 318, 322. For shifting the transmission to second, the clutch 320 is disengaged and the clutch 357 is engaged. Power is transmitted through the following elements: 301, 303, 304, 354, 310, 314, 315, 316, 356, 355, 357, 324. For shifting the transmission to third gear, friction clutches 306 and 320 are engaged, while friction clutches 354 and 357 are disengaged. Motion is transmitted via the elements 301, 303, 306, 309, 355, 356, 316, 320, 318, 322, 324. For shifting the transmission to fourth gear, the friction clutches 306 and 357 are engaged, while the friction clutches 354 and 320 are disengaged. Power is transmitted via the elements 301, 303, 306, 309, 357, 324. Additional gears not shown may be provided to afford a reverse transmission which may or may not include the hydrodynamic clutch.

From the foregoing description of the transmission shown in FIGURE 1 it will appear that the first motion-transmitting train of elements co-operatively connecting the driving shaft 301 with the driven shaft 324 includes the hydrodynamic clutch 302 and a first friction clutch 354 which, when disengaged, will disable this motion-transmitting train. Moreover, it will appear that a second motion-transmitting train connecting the shafts 301 and 324 is established including the second friction clutch 306 (and excluding the hydrodynamic clutch) which, when disengaged, will disable the second motion-transmitting train. The two sets of gears 355, 356 and 318, 322 may be optionally included in either train. Thus, the set of gears 355, 356 will be operative in both the second gear and the third gear condition, the first of which only employs the hydrodynamic clutch, while the set of gears 318, 322 will become operative in the first gear condition and in the third gear condition, the first of which only employs the hydrodynamic clutch. Owing to the exclusion of the hydrodynamic clutch from the second motion-transmitting train, a higher efficiency of the transmission will be secured for the higher speeds.

Figure 2:
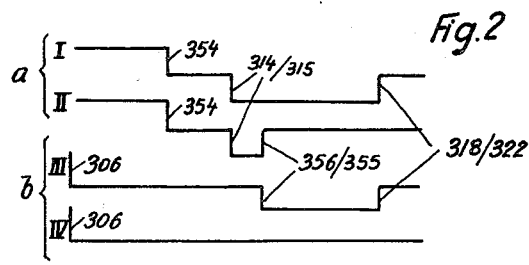
FIGURE 2 is a diagram indicating the flow of power through the transmission at different speed adjustments.
Figure 3:
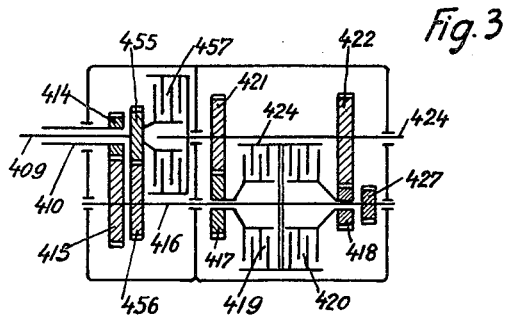
FIGURE 3 illustrates a transmission similar to that of FIGURE 1 for six forward speeds.
Figure 4:
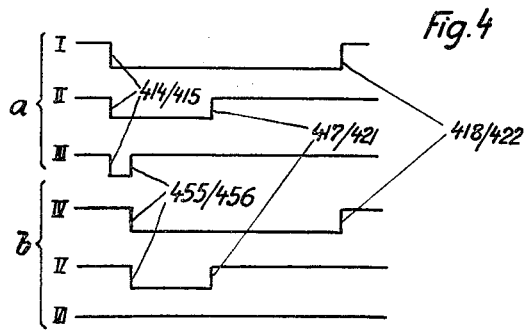
FIGURE 4 is a diagram showing the flow of power through the transmission with different speed adjustments thereof.

Another embodiment of my invention is partly illustrated in FIGURES 3 and 4 showing a transmission differing from that of FIGURE 2 by the provision of an additional set of gears. The two nested shafts 409 and 410 shown in FIGURE 3 are similar to shafts 309 and 310 in FIGURE 1 and are driven in the same manner as shown in FIGURE 1 by means of a hydrodynamic clutch 302 and two friction clutches 306 and 354 from a driving shaft 301. An illustration of such elements has been deemed dispensable in FIGURE 3, but it is to be clearly understood that such elements are, in fact, combined with those shown in FIGURE 3.

When the transmission is set to the three lower gear conditions I to III indicated in FIGURE 4 at $a$, the motion-transmitting train of elements including the hydrodynamic clutch is used, while the friction clutch 306 excluding the hydrodynamic clutch is engaged when the transmission is shifted to fourth, fifth, or sixth gear, as indicated in FIGURE 4 at b. FIGURE 4 shows how the power is transmitted. In the first gear condition clutch 420 only is engaged and in the second gear condition clutch 419 only is engaged. In the third gear condition clutch 457 only is engaged, and in each of these three cases power is transmitted from the hollow shaft 410 through a pair of meshing gears 414, 415 to the secondary transmission shaft 416 and thence either through the pair of gears 418, 422, or the pair of gears 417, 421, or through the pair of gears 455, 456 and the clutch 457 to the driven shaft 424.

In the three upper gear conditions shown in FIGURE 4 at b, power is transmitted through the inner shaft 409 and clutch 306 from the driving shaft 301, the fourth gear providing for transfer of motion through clutch 420, the fifth gear through clutch 419, and the sixth gear through clutch 457. At 427 an additional gear is shown forming part of a set of reverse gears not shown in detail.

The shifting operation may be facilitated by the simultaneous disengagement of clutches 306 and 354. That applies particularly to the operation for shifting the transmission into reverse. If desired, the clutches 320, 357, 420, 419, 457 may be constituted by toothed clutches which may be provided with synchronizing means.

In FIGURES 5 and 6, I have illustrated embodiments of the present invention in which two gearings arranged in tandem are provided, one marked A including a secondary transmission shaft 516 and the other one marked B being an epicyclic gearing. The transmission shown in FIGURE 5 comprises a hydrodynamic clutch designated by 502 as a whole and composed of a driving section 503 rigidly connected with the driving shaft 501 of the transmission and a driven section 504 rigidly connected with one of a pair of shafts 509 and 510 mounted in nested relationship, preferably with the outer one 510 of the pair of shafts. The driving section 503 of the hydrodynamic clutch is connected by a friction clutch 506, preferably comprising one pair of disks, with the internal shaft 509. If desired, a disengageable clutch may be interposed between the driven section 504 of the hydrodynamic clutch and the associated hollow shaft 510. The latter is permanently geared to a secondary transmission shaft 516 by a pair of meshing gears 514 and 515. A shaft 523 is mounted in the transmission casing in coaxial relationship to the shaft 509 and rigidly connected with the latter. The shaft 523 carries two gears 521 and 522 keyed thereto. Gears 517 and 518 which mesh with the gears 521 and 522, respectively, are freely rotatably mounted on and adapted to be clutched to transmission shaft 516 by means of friction clutches 519 and 520, respectively, preferably of the multi-disk type.

The planetary gearing B comprises three coaxial relatively rotatable elements, to wit, a sun gear 558 freely rotatably mounted on shaft 523, a carrier 560 of planetary gears 559 rigidly connected with the driven shaft 524, and an outer internal gear 561. The driven shaft 524 is coaxially aligned with the shaft 523. The sun gear 558 is adapted to be either connected with the shaft 523 by a suitable clutch, such as a friction clutch 562 of the multi-disk type, or to be arrested by a brake 563 mounted on the transmission casing. A second brake 564 is mounted on the transmission casing for the purpose of arresting the outer internal gear 561.

There is a second sun gear 565 fixed to the shaft 523 in permanent mesh with planetary gears 566 mounted on the carrier 560. The gears 566 are so long as to mesh at the same time with the planetary gears 559. If desired, a clutch, such as a friction clutch, may be provided for the purpose of connecting or disconnecting the gear 565 to and from the shaft 523.

This transmission has six forward speeds, the four lower ones being transferred via a hydrodynamic clutch, while the two upper speeds are transferred via the friction clutch 506 by-passing the hydrodynamic clutch.

The transmission operates as follows:

*First gear.*—The clutch 506 is disengaged; clutch 520 is engaged; clutch 519 is disengaged; clutch 562 is disengaged; brake 563 is engaged; brake 564 is disengaged. Power is transmitted via the elements 501, 503, 504, 510, 514, 515, 516, 520, 518, 522, 523, 565, 566, 559, 560, 524; in this operation the epicyclic gearing B reduces the speed.

*Second gear.*—The clutch 519 remains disengaged and the clutch 520 is engaged; clutch 562 is engaged; brake 563 is disengaged. Owing to the engagement of clutch 562, the relatively rotatable elements of the epicyclic gearing are locked to one another and revolve in unison. The part A of the transmission acts in the same manner as in first gear.

*Third gear.*—In part A of the transmission clutch 520 is disengaged and clutch 519 is engaged. Hence, motion is transmitted through the pair of gears 517, 521 in lieu of the pair of gears 518, 522. In the epicyclic gearing B the operation is the same as in first gear, clutch 562 being disengaged and brake 563 being engaged.

*Fourth gear.*—The brake 563 is released; the clutch 562 is engaged. The operation in part A of the transmission is the same as in third gear, while the epicyclic gearing B is operated as in second gear, the elements thereof revolving in unison to provide for a direct connection of shafts 523 and 524.

*Fifth gear.*—The clutch 519 is disengaged; clutch 520 remains likewise disengaged; friction clutch 506 is engaged. The epicyclic gearing B remains set in the same manner as in the first gear condition and in the third gear condition acting to reduce the speed. The hydrodynamic clutch is by-passed by friction clutch 506, the power being transmitted via 501, 503, 506, 509, 523, 565, 566, 560, 524.

*Sixth gear.*—The part A of the transmission remains set as before, while the epicyclic gearing B is set in the same manner as for second gear or fourth gear, thus being locked as to revolve in unison. Power is transmitted directly from shaft 501 via the elements 506, 509 and 523 to driven shaft 524.

For the purpose of shifting the transmission to reverse, the clutch 562 and the brake 563 are disengaged, while the brake 564 is engaged. In this event, the power is transmitted either through the hydrodynamic clutch 502 or through the friction clutch 506 to shaft 523 and thence via gear 565, planetary gears 566, 559 and planetary gear carrier 560 to the driven shaft 524.

If desired, gear 565 may be loosely mounted on shaft 523 and a clutch may be provided for connecting the same. As a result, the transmission permits of an additional forward speed by disconnecting gear 565, engaging clutch 562, releasing brake 563, and engaging brake 564.

The embodiment shown in FIGURE 7 differs from that shown in FIGURE 5 by the provision of two epicyclic gearings C and D arranged in tandem.

The driving shaft 601, which may be the crankshaft of an engine, has an axial bore at its end accommodating the end of a shaft 610 journalled therein on an anti-friction bearing. Moreover, shaft 601 is provided with a flange bolted to the plane end wall of a substantially cylindrical housing that is firmly attached in a manner not shown to the driving section 603 of a hydrodynamic clutch which cooperates with a driven section 602 of said clutch, the latter being encased in the cylindrical housing and adapted to be connected with shaft 610 for common rotation by a disengageable friction clutch 654. Thus, it will appear that this embodiment differs from those described supra by the location of the driven section of the hydrodynamic clutch adjacent to the engine and of the driving section remote from the engine.

Shaft 610 is surrounded by a hollow shaft 609 which is journalled in a transverse wall of the transmission casing by means of an anti-friction bearing and is adapted to be connected with the driving section 603 by means of a disengageable friction clutch 606. It will be noted that anti-friction rollers are interposed between the two shafts 609 and 610.

The shaft 610 is firmly connected or integral with a sun gear 668 of the epicyclic gearing C, whereas the outer internal gear 670 thereof is firmly connected with the hollow shaft 609. Both gears mesh with planetary gears 669 mounted on studs fixed to a carrier 671 formed by a flange of a shaft 672 mounted in coaxial relationship to shaft 610 and preferably extending into an axial bore of the latter and journalled in such bore by suitable anti-friction rollers. The three elements 668, 670 and 671 of the epicyclic gearing are thus mounted in coaxial relationship for relative rotary motion.

The second epicyclic gearing D is formed by three similar relatively rotatable elements, to wit, by a sun gear 675, by an outer internal gear 673 and by a planetary gear carrier 676 carrying a plurality of planetary gears 674 which mesh with the gears 673 and 675.

The internal gear 673 is rigidly connected with the planetary gear carrier 671, whereas the carrier of the planetary gears 674 is formed with a hollow shaft 676 which surrounds the shaft 672 and extends through the right hand end wall of the transmission casing, being journalled therein by a suitable anti-friction bearing. On the outside of the latter the hollow shaft 676 carries a bevel gear 677 fixed thereto which is in mesh with a bevel 678 attached to a driven shaft 679 journalled in a suitable bracket fixed to the transmission casing. If desired, the driven shaft 679 may be mounted to extend parallel to the axis of the transmission and may be geared to shaft 676 by spur gears.

Brakes 680 and 681 are attached to the transmission casing, the former being adapted to arrest the internal gear 670 of the epicyclic gearing C and the latter being adapted to arrest the sun gear 675 acting on a suitable drum which is connected with the sun gear 675 by a bushing journalled on shaft 676. The shaft 672 extends the whole length of shaft 676 through the right hand end wall of the transmission casing and past the bevel gears and at its end carries a suitable drum fixed thereto which cooperates with a brake indicated at 682, the latter being suitably fixed to a bracket bolted to the transmission casing. Thus brake 682 when engaged will arrest shaft 672 and the carrier 671 of gearing C and the internal gear 673 of gearing D. A clutch 684 preferably a friction clutch of the multi-disk type, is mounted on a bell integral with the end of hollow shaft 676 and serves the purpose of optionally clutching the latter to the drum fixed to shaft 672. In this manner, the two shafts 672 and 676 may be connected for rotation in unison. Similarly, a clutch 683, which may be a friction clutch of the multi-disk type, is interposed between an annular member fixed to the internal gear 670 and the drum rigid with the sun gear 675 and adapted to connect the elements 670 and 675 for common rotation.

The operation of the transmission illustrated in FIGURE 7 is the following:

For setting the transmission to first gear condition clutch 654 and brakes 680 and 681 are engaged, whereas the other clutches and brakes are disengaged. Hence, the elements 670 and 675 will be arrested. Motion is transmitted via the following elements: 601, 603, 604, 654, 610, 668, 669, 671, 673, 674, 676, 677, 678, 679. Both epicyclic gearings act as reduction gearings.

For setting the transmission to second gear condition clutches 654 and 684 and the brake 680 are engaged, whereas the other clutches and brakes are disengaged. Thus, the internal gear 670 is arrested, while the clutch 684 locks the elements of the epicyclic gearing D to one another for rotation in unison. Motion is transmitted via the hydrodynamic clutch and the elements 654, 610, 668, 669, 671, 672, 684, 676, 677 and 678 to the driven shaft 679.

For setting the transmission to the third gear condition the clutches 606 and 683 and the brake 682 are engaged, while the other clutches and brakes are disengaged. Hence, the internal gear 673 and the planetary gear carrier 671 are arrested by the shaft 672, the drum attached thereto and the brake 682, while the epicyclic gearing C is permitted to run idly. Motion is transmitted via the elements 601, 603, 606, 609, 670, 683, 675, 674, 676, 677, 678, 679.

In order to set the transmission for fourth gear the clutches 606 and 654 and the brake 681 are engaged, while the other clutches and brakes are disengaged. In this manner, the hydrodynamic clutch will cooperatively connect two of the three elements of gearing C for rotation substantially in unison, both elements being capable of but such relative rotation as will be permitted by the slip in the hydrodynamic clutch. From the planetary gear carrier 671 motion will be further transmitted through the elements 673, 674, 676, 677, 678 to the driven shaft 679.

For shifting the transmission to fifth gear the three clutches 606, 654 and 683 are engaged, while the fourth clutch and all of the brakes are disengaged. Here again the epicyclic gearing C is substantially blocked by the connection of two of its elements through the hydrodynamic clutch. The epicyclic gearing D is likewise blocked by engagement of clutch 683. Therefore, all of the rotary elements of the transmission revolve substantially in unison causing the motion to be transferred from the driving shaft 601 to the bevel gear 677 substantially at the ratio of 1:1.

For shifting the transmission into reverse the clutches 654 and 683 and the brake 682 are engaged and the other clutches and brakes are disengaged. Hence, the internal gear 670 of the epicyclic gearing C is connected with the sun gear 675 of the epicyclic gearing D, whereas the planetary gear carrier 671 of gearing C and the internal gear 673 of gearing D are arrested. Motion is transmitted via the elements 601, 603, 602, 654, 610, 668, 669, 670, 683, 675, 674, 676, 677, 678, and 679. In this motion-transmitting train the planetary gears 669 will reverse the rotation.

From the foregoing description it will appear that I have provided a transmission of simple design which is capable of being set up for a plurality of different ratios of transmission by the simple engagement or disengagement of friction means, such as clutches and brakes.

While I have described a number of preferred embodiments of the invention, I wish it to be clearly understood that the same is in no way limited to the details of such embodiments, but is capable of numerous modifications within the scope of the appended claims.

I claim:

1. A multi-speed transmission comprising input means, output means, a first motion transmitting train including fluid coupling means, a second motion transmitting train including friction coupling means, at least two sets of meshing gear means providing at least three forward speeds, each of said two sets of meshing gear means including a planet carrier supporting thereon a planet gear in meshing engagement with two coaxially arranged gears, the gears of one of said sets being separate from the gears of the other gear set, means including one set of said gear means for optionally connecting said input means with said output means through one of said motion transmitting trains in at least two adjacent forward speeds, and for optionally connecting said input means with said output means exclusively through the other of said motion transmitting trains in at least one other forward speed, and means for connecting said input means with said output means in another forward speed providing a one-to-one transmission ratio therebetween.

2. In a transmission arranged for providing a plurality of forward drive ratios and a reverse drive ratio between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft and a second one of said elements connected to said additional shaft, third coupling means for connecting a third one of said gear set elements to said additional shaft, brake means for braking a fourth one of said gear set elements, and fourth coupling means for connecting a fifth one of said gear set elements to said driven shaft, one of said forward drive ratios being completed through said second coupling means and said gear set by engagement of said third coupling means and said brake means, and another of said forward drive ratios being completed through said first coupling means and said intermediate shaft by engagement of said first coupling means with said brake means disengaged.

3. In a transmission arranged for providing a plurality of forward drive ratios and a reverse drive ratio between a drive shaft and a driven shaft, the combination of an additional shaft, first coupling means for transmitting torque from said drive shaft to said additional shaft, a planetary gear set having a plurality of elements with a first one of said elements connected to said driven shaft and a second one of said elements connected to said additional shaft, second coupling means for connecting a third one of said gear set elements to said additional shaft, brake means for braking a fourth one on said gear set elements, and third coupling means for connecting a fifth one of said gear set elements to said driven means, one of said forward drive ratios being completed through said first coupling means and said gear set by engagement of said second coupling means and said brake means, another of said forward drive ratios being completed through said first coupling means and said gear set by engagement of said second coupling means with said brake means disengaged, and said reverse drive ratio being completed through said gear set by engagement of said brake means with one of said coupling means engaged and another of said coupling means disengaged.

4. In a transmission for providing a plurality of speed ratios between a drive shaft and a driven shaft, change-speed gear means including a plurality of gear elements connected between said drive shaft and said driven shaft, first shaft means connected with a first element of said change-speed gear means, first coupling means for transmitting torque between said drive shaft and said first shaft means in two consecutive speed ratios of said transmission, second shaft means connected with a second element of said change-speed gear means, second coupling means independently actuatable from said first coupling means for transmitting torque between said drive shaft and said second shaft means in two consecutive speed ratios of said transmission, means including third coupling means selectively operable to transmit torque between said second shaft means and a third element of said change-speed gear means, and said driven shaft being connected to a fourth element of said change-speed gear means.

5. The combination according to claim 4, further comprising brake means for a fifth element of said change-speed gear means.

6. The combination according to claim 5, further comprising fourth coupling means for selectively transmitting torque between said driven shaft and one of said gear elements other than said second, third and fourth gear elements.

7. The combination according to claim 6, further comprising brake means for braking said third gear element.

8. In a transmission of the character described with at least five forward speeds, the combination comprising a driving shaft, a driven shaft, a first motion-transmitting train of elements operatively connecting said driving shaft with said driven shaft and including a hydrodynamic clutch and a first friction clutch for selectively disabling said first motion-transmitting train upon disengagement thereof, a second motion-transmitting train operatively connecting said driving shaft with said driven shaft exclusive of said hydrodynamic clutch, but including a second friction clutch for selectively disabling said second motion-transmitting train upon disengagement thereof; said first motion-transmitting train including meshing gear set means providing at least three speeds and said second motion-transmitting train including meshing gear set means providing at least two forward speeds, and means for selectively and consecutively actuating said first motion-transmitting train in at least two adjacent forward speeds or said second motion-transmitting train in at least two adjacent forward speeds different from said last-mentioned two forward speeds.

9. The combination claimed in claim 8 in which the gear set means of said second motion-transmitting train form part of an epicyclic transmission, and wherein a third set of gears is included in said first motion-transmitting train of elements only.

10. In a transmission of the character described with at least five forward speeds, the combination comprising a driving shaft, a driven shaft, a first motion-transmitting train of elements operatively connecting said driving shaft with said driven shaft and including a hydrodynamic clutch, first meshing gear set means providing ta least two transmission speeds, and a first friction clutch for selectively disabling said motion-transmitting train upon disengagement thereof; a second motion-transmitting train operatively connecting said driving shaft with said driven shaft exclusive of said hydrodynamic clutch but including a second meshing gear set means providing at least three transmission speeds and a second friction clutch for selectively disabling said second motion-transmitting train upon disengagement thereof; the transmission ratios of said first meshing gear set means in the two transmission speeds thereof being lower than the transmission ratios of said second gear set means in the three transmission ratios thereof, and means for optionally and consecutively engaging at first said first motion transmitting train and each of the two transmission ratios thereof in two consecutive speeds and thereafter said second motion-transmitting train and each of the respective three transmission ratios thereof.

11. The combination claimed in claim 10, in which at least one of said two gear set means includes planetary gears.

12. A multi-speed planetary transmission having a plurality of forward speeds, comprising input means, output means, two planetary gear means each having a plurality of rotatable elements including two central gears, at least one planet gear meshing with two respective central gears and a planet carrier for a respective planet gear; first engageable means operatively connecting one central gear of each of said planetary gear means with said input means in at least one of said forward speeds; second engageable means including a hydrodynamic device operatively connecting the other one of the two central gears of one of said planetary gears with said input means in another one of said forward speeds with said first engageable means engaged, and means operatively connecting said output means with at least one of the rotatable elements of the other planetary gear means.

13. A multi-speed planetary transmission having a plurality of forward speeds according to claim 12, wherein said last-mentioned means is adapted to connect one rotatable element each of said two planetary gear means with said output means.

14. A multi-speed planetary transmission having a plurality of forward speeds, comprising input means, output means, two planetary gear means each having a plurality of rotatable elements including two central gears, at least one planet gear meshing with two respective central gears, and a planet carrier for a respective planet gear; first engageable means operatively connecting said input means with a first one of the rotatable elements of one of said planetary gears, second engageable means operatively connecting said input means with a second one of the rotatable elements of said one planetary gear means, third engageable means operatively connecting said one rotatable element of said one planetary gear means with one of the rotatable elements of the other planetary gear means, said output means being operatively connected with a second one of the rotatable elements of said other planetary gear means, and a third one of said rotatable elements of said one planetary gear means being connected with a third one of the rotatable elements of said other planetary gear means.

15. A multi-speed planetary transmission having a plurality of forward speeds according to claim 14, wherein said first and second mentioned rotatable elements of said one planetary gear means are the two central gears thereof.

16. A multi-speed planetary transmission according to claim 15, wherein the first and second-mentioned rotatable elements of said other planetary gear means are one of the two central gears thereof and the planet carrier thereof.

17. A multi-speed planetary transmission having a plurality of forward speeds according to claim 16, wherein the third-mentioned rotatable element of said one planetary gear means is the planet carrier thereof and wherein the third-mentioned rotatable element of said other planetary gear means is the other of the two central gears thereof.

18. A multi-speed planetary transmission having a plurality of forward speeds according to claim 17, further comprising fourth engageable means for selectively connecting said output means with both said third-mentioned rotatable elements of said one and other planetary gear means.

19. A multi-speed planetary transmission having a plurality of forward speeds according to claim 14, further comprising fourth engageable means for selectively connecting said output means with both the third-mentioned rotatable elements of said one and other planetary gear means.

20. A multi-speed planetary transmission having a plurality of forward speeds according to claim 19, further comprising brake means for at least one of the three rotatable elements consisting of said first-mentioned rotatable element of said one planetary gear means, said first-mentioned rotatable element of said other planetary gear means, and said third-mentioned rotatable element of said one planetary gear means.

21. A mutli-speed planetary transmission having a plurality of forward speeds according to claim 20, wherein at least two brake means are provided for two of said three last-mentioned rotatable elements.

22. A multi-speed planetary transmission having a plurality of forward speeds according to claim 21, wherein at least one brake means is provided for each of said three last-mentioned rotatable elements.

23. A multi-speed planetary transmission having a plurality of forward speeds according to claim 14, further comprising a hydrodynamic coupling in said second engageable means.

24. A multi-speed planetary transmission having a plurality of forward speeds according to claim 14, further comprising brake means for at least one of the three rotatable elements consisting of said first-mentioned rotatable element of said one planetary gear means, of the first-mentioned rotatable element of said other planetary gear means, and of the third-mentioned rotatable element of one of said two planetary gear means.

25. A multi-speed planetary transmission having a plurality of forward speeds, comprising input means, output means, two planetary gear means each having a plurality of rotatable elements including two central gears, at least one planet gear meshing with two respective central gears, and a planet carrier for a respective planet gear; first engageable means operatively connecting said input means with one of the two central gears of one of said planetary gear means, second engageable means operatively connecting said input means with the other of the two central gears of said one planetary gear means, third engageable means operatively connecting said first-mentioned central gear of said one planetary gear means with one central gear of the other of said planetary gear means, said output means being connected with the planet carrier of said other planetary gear means, and the other central gear of said other planetary gear means being operatively connected with the planet carrier of said one planetary gear means.

26. A multi-speed planetary transmission having a plurality of forward speeds according to claim 25, further comprising fourth engageable means selectively connecting said output means with said planet carrier of said one planetary gear means.

27. A multi-speed planetary transmission having a plurality of forward speeds according to claim 26, further comprising brake means for at least one of the three rotatable elements consisting of said first-mentioned central gear of said one planetary gear means, of said first-mentioned central gear of said other planetary gear means, and of said planet carrier of said one planetary gear means.

28. A multi-speed planetary transmission according to claim 27, wherein at least two brake means are provided for two of said last-mentioned three rotatable elements.

29. A multi-speed planetary transmission having a plurality of forward speeds according to claim 28, further comprising hydrodynamic coupling means intermediate said second engageable means and said second-mentioned central gear of said one planetary gear means.

30. A multi-speed planetary transmission having a plurality of forward speeds according to claim 25, wherein said first-mentioned central gear of said one planetary gear means is a ring gear, said second-mentioned central gear of said one planetary gear means is a sun gear, and wherein said first-mentioned central gear of said other planetary gear means is a sun gear.

31. In a transmission of the character described, the combination comprising a driving shaft, a pair of shafts mounted in nested relationship, a first friction clutch for selectively connecting said driving shaft with one shaft of said pair of shafts, a hydrodynamic clutch and a second friction clutch operatively connecting said driving shaft with the other shaft of said pair of shafts, an epicyclic gear having three relatively rotatable elements and including a planet carrier for supporting thereon planetary gears, one of said elements being connected with said one shaft of said first-mentioned pair of shafts, another one of said elements being connected with the other shaft of said first-mentioned pair of shafts, a driven shaft, gear means for gearing the third one of said elements to said driven shaft, means for optionally arresting one of said elements, and means for optionally connecting said elements for common rotation, said means for gearing the third one of said elements to said driven shaft including a second epicyclic gearing having three relatively rotatable elements and including a second carrier of planetary gears, a relatively stationary transmission casing enclosing essentially completely the transmission with a part of said driving shaft and of said driven shaft extending inwardly of said casing, a plurality of further nested shafts extending outwardly of said casing, two of said rotary elements of said second epicyclic gearing being rigidly connected with respective ones of said further nested shafts, and a brake and a clutch located outside of said casing for selectively arresting one of said further nested shafts or connecting the same to the other one of said further nested shafts.

References Cited in the file of this patent

UNITED STATES PATENTS

| | | |
|---|---|---|
| 2,302,714 | Pollard | Nov. 24, 1942 |
| 2,312,849 | Pollard | Mar. 2, 1943 |
| 2,353,905 | Kelley | July 18, 1944 |
| 2,454,014 | Seybold | Nov. 16, 1948 |
| 2,518,824 | Simpson | Aug. 15, 1950 |
| 2,687,657 | Kugel et al. | Aug. 31, 1954 |